United States Patent [19]

Weitzel

[11] Patent Number: 4,613,893
[45] Date of Patent: Sep. 23, 1986

[54] METHOD OF PRODUCING A TIME-MULTIPLEX COLOR TELEVISION SIGNAL

[75] Inventor: Otto Weitzel, Stadtallendorf, Fed. Rep. of Germany

[73] Assignee: Robert Bosch GmbH, Stuttgart, Fed. Rep. of Germany

[21] Appl. No.: 665,298

[22] Filed: Oct. 26, 1984

[30] Foreign Application Priority Data

Nov. 2, 1983 [DE] Fed. Rep. of Germany ....... 3339533

[51] Int. Cl.$^4$ ............................................. H04N 11/10
[52] U.S. Cl. ....................................... 358/11; 358/12; 358/13; 358/14
[58] Field of Search ........................ 358/11, 12, 13, 14

[56] References Cited

U.S. PATENT DOCUMENTS

| | | | |
|---|---|---|---|
| 3,781,463 | 12/1973 | Van der Bussche | 358/12 |
| 4,127,865 | 11/1978 | Poetsch | 358/12 |
| 4,335,393 | 6/1982 | Pearson | 358/11 |

FOREIGN PATENT DOCUMENTS

| | | | |
|---|---|---|---|
| 2348291 | 4/1975 | Fed. Rep. of Germany | 358/12 |
| 2629706 | 1/1978 | Fed. Rep. of Germany | 358/12 |

Primary Examiner—John W. Shepperd
Attorney, Agent, or Firm—Frishauf, Holtz, Goodman & Woodward

[57] ABSTRACT

Digitalized luminance and color difference signals, the former sampled at twice the sampling frequency of the latter, are interleaved into two data streams (k, m) in each of which a sample of the luminance signal separates samples of different color television signals, one of these streams then being delayed by one period, so the two data streams will simultaneously present successive samples of the same signal component (luminance or color difference). A system of transfer switches and two pairs of 1-kilobyte (one line) stores then makes possible the sequencing, at twice the sampling rate of the luminance component, of all the luminance signal bytes of a television line followed by all of the bytes for that line of one color difference component and finally all of the bytes for that line of the other color television component, with the desired ratio of component segment length in each line, as a time-multiplex color television signal. That signal can then be converted into analog form and provided with the necessary blanking intervals and synchronization pulses.

4 Claims, 18 Drawing Figures

FIG. 2a  Y - 13,5 MByte/sec
FIG. 2b  U - 6,75 MByte/sec
FIG. 2c  V - 6,75 MByte/sec Load
FIG. 2d  Y-A
FIG. 2e  U-A
FIG. 2f  V-A FIG. 2g  Y-B
FIG. 2h  U-B
FIG. 2i  V-B
FIG. 2k  MUX A'

FIG. 2l  MUX A
FIG. 2m  MUX B

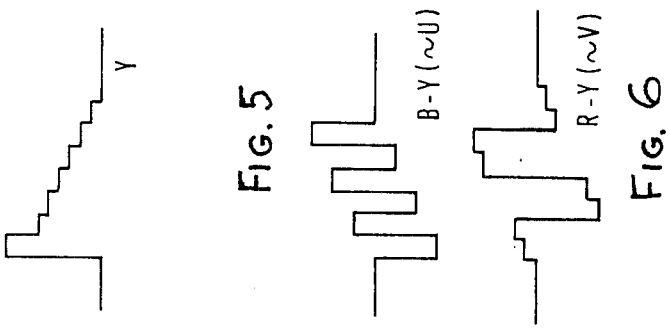
Fig. 4
Fig. 5
Fig. 6
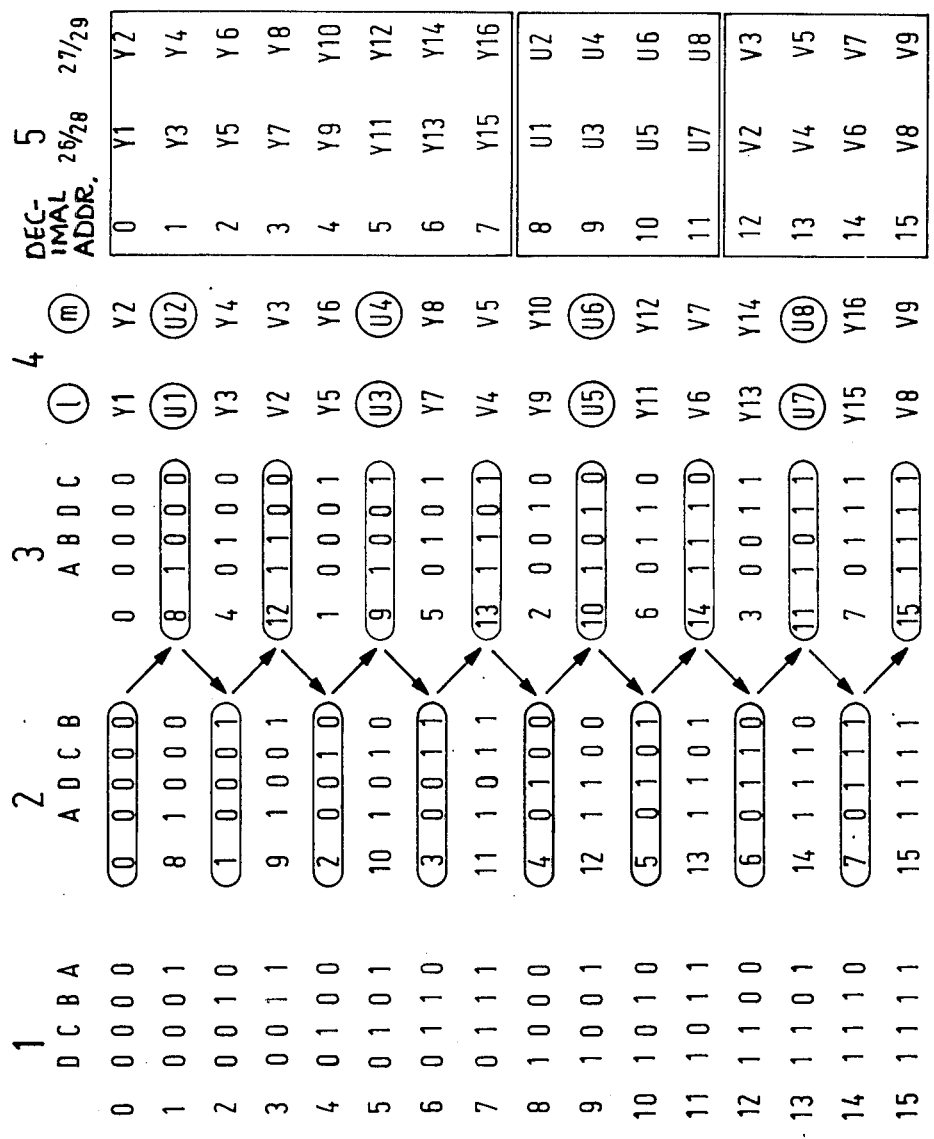
Fig. 3

METHOD OF PRODUCING A TIME-MULTIPLEX COLOR TELEVISION SIGNAL

This invention concerns a method of producing a time-multiplex color television signal of which the several signal components, a luminance component conventionally designated Y and two color-difference chrominance components conventionally designated U and V are time-multiplexed by digital techniques, more particularly so as to keep all the component signals of a television line together in a television line period.

The reason why time-multiplexing of the luminance and chrominance components is desired is that the well-known frequency multiplex method for simultaneous and compatible transmission of luminance and chrominance in color television (by systems known as NTSC, SECAM and PAL), there is destructive interference to a certain degree between the luminance and chrominance components, because the modulated color carrier must be transmitted in the luminance frequency band. The resulting disturbing effects are known as cross-color (fine luminance detail producing cross-talk in the color channel) and cross-luminance (color carrier components producing cross-talk in the luminance channel). All measures which lead to reduction of these cross-color and cross-luminance effects can bring about a substantial improvement of the quiescence of the picture. Avoidance of luminance-chrominance interference is possible by transmitting the luminance and chrominance components in time-multiplex, because in this manner all possible mixing of the luminance and chrominance components with each other is excluded. In order to produce such a time-multiplex color television signal, time compression both of the color difference signals R-Y and B-Y, as well as of the luminance signal Y, are necessary in order to put both chrominance components together with the luminance signal in the time slot of a single line.

In the article "Digitale Bild- und Tonübertragung", on pp. 83 to 86 of No. 21, and on pp. 67 to 70 of No. 22 of the periodical "Funkschau" in 1982, a method for producing a time-multiplex color video signal has already been described in which, however, the required storage capacity, involving line stores for each of the three signals to be transmitted in time-multiplex, is discouragingly expensive.

SUMMARY OF THE INVENTION

It is an object of the present invention to provide a method of generating a time-multiplexed color television signal in a manner that requires only a small amount of signal storage capacity.

Briefly, the three components are time-multiplexed, first in to two data streams, in each of which there are at least twice as many bytes (words) of the luminance component as of either of the color difference components, involving the use of a higher sampling frequency for the luminance component than for either of the color difference components. Then, reciprocating switches for each of the data streams, operating at half the line frequency, alternately write successive lines of each data stream into one of a pair of 1-kilobyte stores, each data stream having its own pair of stores. The stores are read out at twice the higher sampling frequency, i.e., twice the write-in frequency, and the read-outs are sequentially combined, first line by line by a pair of reciprocating switches operating at half the line frequency in a manner complementary to the previously mentioned switch pair and then at the byte read-out frequency to provide a digital time-multiplexed color video signal of the desired type, which can then be converted to an analog signal, supplied with synchronizing pulses and band-limited before delivery to a transmission line or recording channel. In contrast to to the requirement of four 1-kilobyte stores, the "straightforward solution" shown in FIG. 9 on page 67 of the above-identified issue of "Funkschau", would require three 4-kilobyte stores. This reduces practically by a factor of three the equipment expense for generating a time-multiplexing color video signal. In the method of the invention it is particularly useful to form the two data stream by forming the bytes of one data stream in between the formation of bytes of the other, and then to delay one data stream by one byte period, so that the two data streams will have successive bytes of the same component present in them at the same time. It then becomes possible for the final sequencing to produce a long string of bytes of the same component before going to the bytes of the other components relating to the same line.

BRIEF DESCRIPTION OF THE DRAWINGS

Further details of the method of the invention involving improvements of the invention as already summarized appear in the detailed description that follows. The invention is further described therein by way of illustrative example with reference to the annexed drawings, in which:

FIGS. 2a, 2b, 2c, 2d, 2e, 2f, 2g, 2h, 2i, 2k, 2l, 2m and 2n are timing diagrams drawn on one sheet to a common time scale illustrating the content of data streams in various parts of the apparatus of FIG. 1, FIG. 3 is a table for the storage location addressing of the data words of the data streams and FIGS. 4, 5 and 6 are wave diagrams respectively corresponding to the successive values of Y, U and V of column 5 of FIG. 3.

DESCRIPTION OF THE ILLUSTRATED EMBODIMENT

Figure 1:
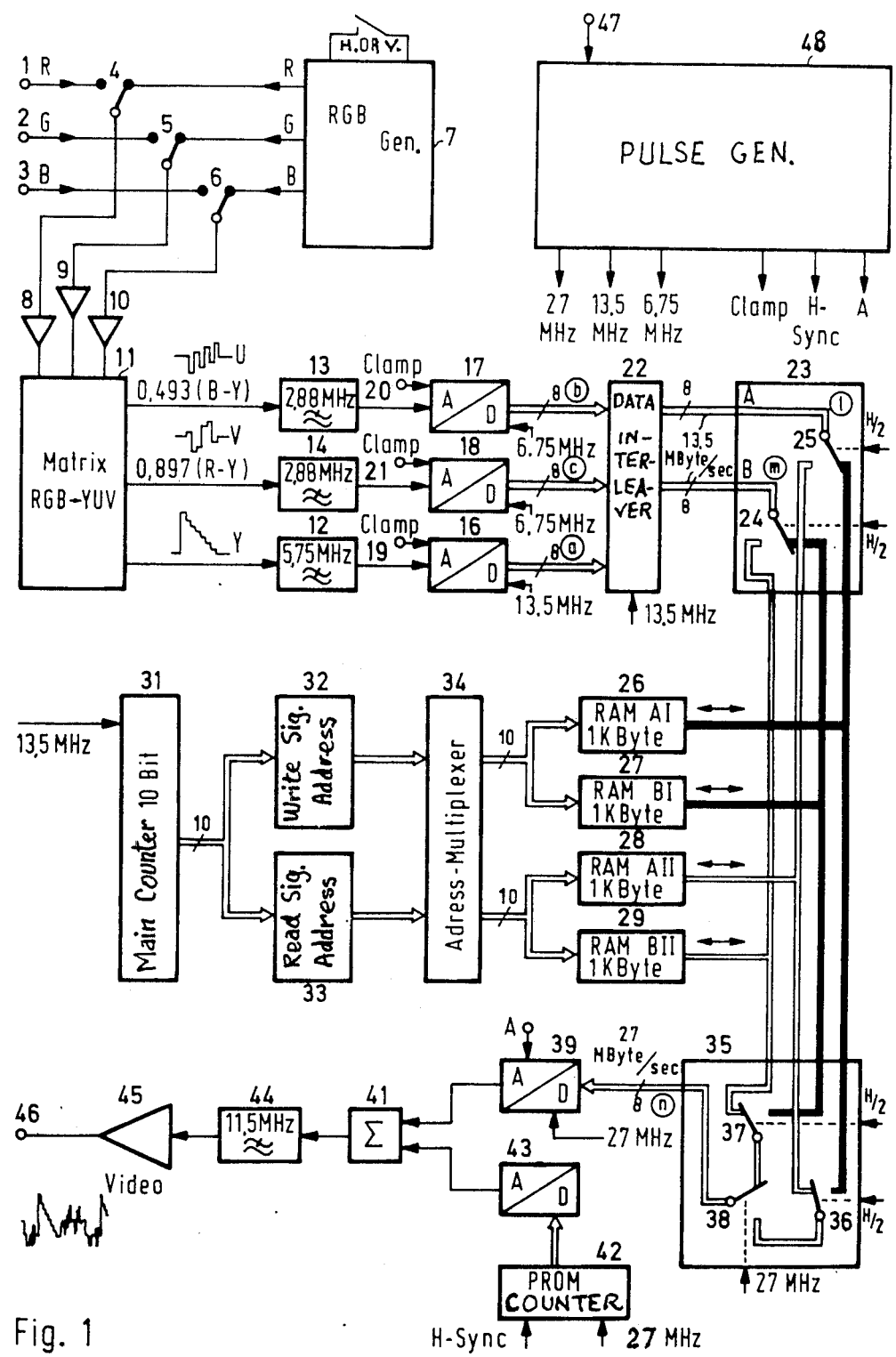
FIG. 1 is a circuit block diagram of apparatus for carrying out the method of the invention.

A color television signal source not shown in the drawing produces the monochrome signal value signals R, G, B for the primary colors and makes them available at the respective terminals 1,2 and 3 of FIG. 1. A color bar generator 7, such as is normally available in a television studio, also produces monochrome television signals in the primary colors R, G, B and a set of changeover switches 4, 5, 6 is available for switching the inputs of the amplifiers 8, 9 and 10 either to the terminals 1, 2, 3 or to the outputs of the color bar generator 7 as may be required for checking the quality of the incoming color television signal. The R, G and B signals produced at the respective outputs of the amplifiers 8, 9 and 10 are then converted, in a matrix unit 11, into a luminance signal Y and the two color difference signals U and V, the latter two respectively corresponding to the differences B-Y and R-Y. The matrix unit 11 is of conventional type.

The luminance signal Y is then passed through a low-pass filter 12 having a cut-off frequency of 5.75 MHz and the two color difference signals U and V are each passed through a low-pass filter 13,14 having a cut-off frequency of 2.88 MHz.

The low-pass filter signals Y, U and V are then supplied to the respective analog-to-digital (A/D) converters 16,17 and 18 in which 8-bit pulse code modulated digital signals are produced out of the analog signals by sampling the luminance signal at 13.5 MHz and the two color difference signals each at 6.75 MHz. Clamping pulse signals for the A/D converters 16, 17 and 18 are supplied through the terminals 19,20 and 21. A digitalized luminance signal of 13.5 megabytes per second (FIG. 2a) consequently appears at the output of the A/D converter 16 and a digitalized color difference signals of 6.75 megabytes per second (FIGS. 2b and 2c) appear at the respective outputs of the A/D converters 17 and 18. A data converter 22 operated at the higher sampling frequency of 13.5 MHz then serves to interleave these three digital data signal streams supplied to its input into two data streams each of 13.5 megabytes per second (FIGS. 2l, and 2m) by a time-multiplex operation. The data converter 22 consists essentially of three reciprocating transfer switches, a first transfer switch that switches the luminance signal at 13.5 MHz from one to the other of the lines respectively connected to the second and third of these switches (FIGS. 2d and 2g). The second and third transfer switches, likewise operating at 13.5 MHz switch from one color television signal (FIGS. 2e and 2h) to the other (FIGS. 2f and 2i) interposing a luminance signal in-between.

In FIGS. 2d to 2i, pulse sequences are represented during the "low" state of which the corresponding transfer switch is closed, so that during this period the then present data word can in each case be transmitted into the output data stream. Thus, for example, in the "low" states of the pulse sequence according to FIG. 2d, the respective odd-numbered luminance data words Y1, Y3, Y5 . . . are transmitted. In alternation there follow during the low state of the pulse sequences according to FIG. 2e, the odd-numbered color difference data words U1, U3, U5, . . . and similarly during the "low" state of the pulse sequences according to FIG. 2f, the even-numbered color difference data words V2, V4, V6, . . . . A data stream according to FIG. 2k is accordingly produced, which after delaying by one data word period, becomes the data stream according to FIG. 2l and is passed on for further processing in that form. The data stream according to FIG. 2m is produced in the same way, but not delayed.

The two data streams of FIGS. 2l and 2m available at the output of the data converter 22 are then supplied to a switching unit 23 having two switching devices 24 and 25, each of which stay for one line period in each of its two positions in alternation (i.e., full cycles of these switches occur at half the line frequency). The switching devices 24 and 25 respectively load the line stores 26 and 27 (each of 1 kilobyte capacity) for one line period and then connect the respective line stores 28 and 29 (also of 1 kilobyte capacity) during the next line period. During each line period, the data streams are written into one pair of line stores while the other pair of line stores have their content read out.

The addressing of the storage locations in the line stores, which is to be more fully explained with reference to the table shown in FIG. 3, is advanced by a main counter 31 clocked at 13.5 MHz and acting through an address and write signal generator circuit 32 and an address and read signal generator circuit 33. The outputs of the circuits 32 and 33 are then put through an address multiplexer circuit 34 and supplied to the address inputs of the line stores 26,27,28 and 29. In the preferred system illustrated, the address signals are 10-bit signals.

For simplicity, 4-bit address signals are illustrated in the table of FIG. 3 for the storage location addressing.

In Column 1 of the table, there is shown next to the decimal number the corresponding binary number in the order DCBA produced by the counter 31 which at the same time in the listed sequence represent the addressing of the storage locations during read-out.

In Columns 2 and 3, the write-in addresses respectively for the luminance signal and the chrominance signal are listed. In the addressing of the storage locations of the luminance signal, the last place of the corresponding number is set at the first place—sequence ADCB—and for the chrominance signal the next-to-last place is also put in second position, producing the bit sequence ABDC.

In Column 4, the two data streams respectively according to FIGS. 2l and 2m are put in in separate columns with their horizontally adjacent data words being those that simultaneously appear at the inputs of the line stores 26 and 27.

In Column 5, there are finally shown the data words written into the line stores which can be read out sequentially in the given sequence.

As can readily be recognized, by this advantageous storage addressing scheme illustrated in columns 2 and 3, the data words present in the sequence of column 4 can be put into a sequentially readable sequence, so that thereafter a color video signal available as a time-multiplex signal having segment length for each line in the proportion Y:U:V=2:1:1 can be processed further.

Figure 2N:
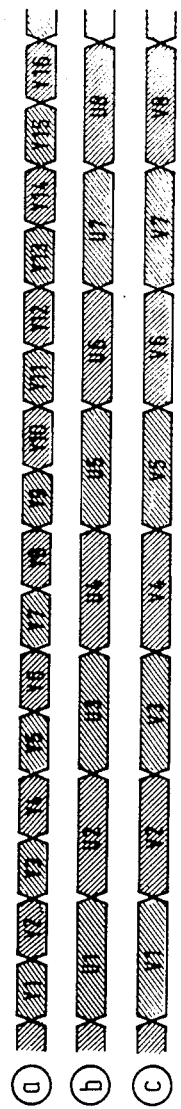
Figure 2N:
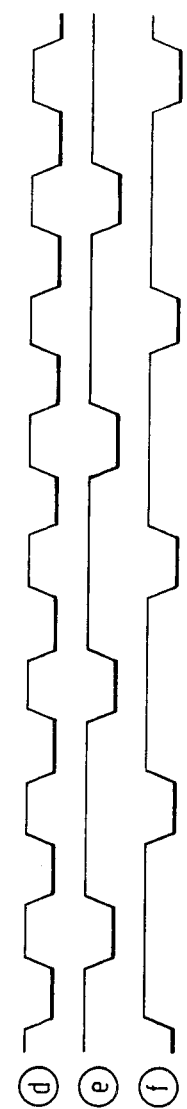
Figure 2N:
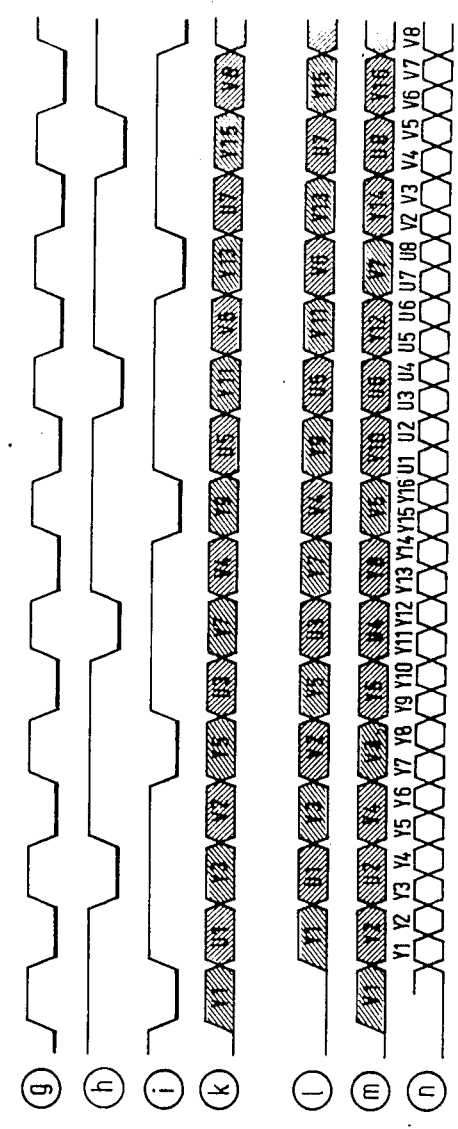

These two data streams available at the output of the line stores 28 and 29 in accordance with column 5 of FIG. 3 are then supplied to a second switching unit 35, which like the first has switching devices 36 and 37 holding each of two positions for a line period in alternation and also having a third switching device 38 operating at twice the byte rate, 27 MHz, of the incoming data streams. At the output of the reciprocating transfer switch 35 there accordingly is produced a data stream at the rate of 27 megabytes per second which is represented in FIG. 2n in which the data words of the luminance component and then of each of the color difference components appear in successive segments of each line with a segment length ratio of 2:1:1.

In order to produce an analog time-multiplex signal, the data stream n is then supplied to a D/A converter 39 clocked at 27 MHz and also provided with blanking pulses A. For synchronization of the analog time-multiplex signals, a summing stage 41 is provided at one input of which the analog time-multiplex signal is provided and at the other input of which a horizontal synchronization signal is made available by means of a counter 42 clocked at 27 MHz and a further D/A converter 43.

The output signal of the summing stage 41 is then put through a low-pass filter 44 having a cut-off frequency of 11.5 MHz, after which it is amplified in an amplifier 45, the output of which is provided to the output terminal 145 for further processing or for distribution.

A clock pulse generator 48 is provided to generate the necessary synchronizing signals and derive all of the necessary sampling and clocking signals for operation of the circuit under control of an external synchronizing signal supplied at the terminal 47.

Although the invention has been described with reference to a particular illustrative example, it will be understood that variations and modifications are possible within the inventive concept.

I claim:

1. Method of producing a time multiplex color television signal of which the several signal components (Y,U,V) necessary for reproduction of one color television line are multiplexed into and contained in a single television line transmission period, comprising the initial step of producing by separately digitalizing into digital sample words a luminance component (Y) and two chrominance components (U,V), a separately coded television signal in which the luminance component (Y) is sampled for digitalization at a higher rate than said chrominance components and further comprising in accordance with the invention, the further steps of:

time-interleaving said words of said components in the ratio of two words of said luminance component to every word of each of said chrominance components at the word interleaving rate equal to said higher sampling rate, said higher sample rate being substantially twice the sampling rate of each of said chrominance components, and producing thereby two data streams (l,m), each of said word interleaving rate;

writing the data of said two data streams line by line into a set of stores from which they are thereafter read out line by line, said set of stores being disposed so that single lines of said respective data streams are successively written in a first pair of separate stores of said set while previously stored single lines of said respective data streams are successively read out of a second pair of separate stores of said set, under control of a corresponding addressing operation for writing into and reading out of said stores, the word write-in rate being equal to said higher sampling rate and the word read-out rate being twice said higher sampling rate with the read-out periods alternating between a store of said first pair and a store of said second pair, and combining words alternately taken from line sequences read out respectively from a store of said first pair and a store of said second pair into a sequential data word stream (n) which is time multiplexed line by line.

2. Method according to claim 1, in which the time-interleaving step producing said two data streams (l,m) is produced by serial sampling at said higher sampling frequency of said three signal components (Y,U,V).

3. Method according to claim 1, in which one of said data streams (l) is produced by first producing a precursor data stream (k) which is thereafter delayed by one data word period with respect to the other (m) of said two data streams, and the interleaving step is so performed that two immediately successive data words of the same signal component are written in simultaneously into stores in the following step of the method at corresponding storage locations in the respective stores.

4. Method according to claim 1, in which said separately digitalized luminance component and chrominance components are obtained by matricizing color signals (R,G,B) and then low-pass filtering of the matricized luminance (Y) and color difference signals (U,V) before digitalization, and in which method, further, the interleaving step is performed by a transfer switch system (22) by which the three digital signal components are switched at a switching frequency corresponding to said higher sampling frequency, and in which the reading into said set of stores is performed with the help of two reciprocating transfer switches (24,25), each cycled at half the line frequency, the reading out from said set of stores is performed with the help of another two reciprocating transfer switches (36,37) operating at half the line frequency and the combining of read-out words into a sequential data word stream (n) is performed by a reciprocating transfer switch to select words at twice said higher sampling frequency, said sequential data stream then being converted by a digital-to-analog converter into an analog time multiplex signal having television synchronizing signals inserted therein and being thereafter band limited by filtering for use as a complete analog composite television signal.

* * * * *